United States Patent [19]
Quimby

[11] Patent Number: 5,367,573
[45] Date of Patent: Nov. 22, 1994

[54] SIGNATURE DATA OBJECT

[75] Inventor: John Quimby, Acton, Mass.

[73] Assignee: Digital Equipment Corporation, Maynard, Mass.

[21] Appl. No.: 86,946

[22] Filed: Jul. 2, 1993

[51] Int. Cl.$^5$ .............................................. H04K 1/00
[52] U.S. Cl. ....................................... 380/25; 380/23; 380/30
[58] Field of Search ....................... 380/3, 4, 23, 25, 30

[56]  References Cited
U.S. PATENT DOCUMENTS

| | | | |
|---|---|---|---|
| 4,405,829 | 9/1983 | Rivest et al. | 380/23 |
| 4,930,073 | 5/1990 | Cina, Jr. | 380/25 X |
| 5,005,200 | 4/1991 | Fischer | 380/30 |
| 5,136,643 | 8/1992 | Fischer | 380/23 |
| 5,136,647 | 8/1992 | Haber et al. | 380/23 X |
| 5,189,700 | 2/1993 | Blandford | 380/23 |

Primary Examiner—Tod R. Swann
Attorney, Agent, or Firm—Albert P. Cefalo; Barry N. Young

[57] ABSTRACT

A "signature data object" (SDO) is a machine-readable structured data record which a signer may associate with a parent object, e.g., an electronic document. An SDO comprises three required encoded parts: A signature header structure; a signature data structure; and a signature proof block. An SDO may include data identifying a role in which the signer is acting and a message code encoding a semantic for the parent object/document such as "submitted by," "approved," etc. In one embodiment, the SDO includes at least one descriptor of (1) a subordinate part of the parent object or (2) an attachment of the parent object/document, to whose (i) value or (ii) presence the validity of the signature data object is bound. An SDO may also include data indicating that it supersedes a specified other SDO associated with that parent object.

17 Claims, 3 Drawing Sheets

SIGNATURE DATA OBJECT

| | | | |
|---|---|---|---|
| SIGNATURE HEADER | SIGNATURE UNIQUE IDENTIFIER 1 | | |
| | DATA/TIME STAMP 2 | | |
| | APPLICATION PROCESS IDENTIFIER 3 | MAJOR VERSION 4 | |
| | | MINOR VERSION 4 | |
| | PRINCIPAL IDENTIFIER OF SIGNER 5 | | |
| | MESSAGE CODE W/ SEMANTIC 6 | | |
| | OPTIONAL ELEMENTS: | USER PROFILE DATA 7 | |
| | | ROLE IDENTIFIER 8 | |
| | | ON-BEHALF-OF PRINCIPAL IDENTIFIER 9 | |
| | | SUBMITTING-SESSION IDENTIFIER 10 | |
| | | SECURITY DOMAIN IDENTIFIER 11 | |
| | | SID OF SUPERSEDED SDO ON SAME PARENT OBJECT 12 | |
| | | COMMENT STRING(S) 13 OR OTHER APPLICATION-SPECIFIC DATA ELEMENTS | |
| SIGNATURE DATA | UID OR DESCRIPTOR OF PARENT OBJECT 14 | | |
| | OPTIONAL ELEMENTS: | DESCRIPTORS OF IDENTIFIED PARTS OF PARENT OBJECT AND VALUE EXPRESSION SPECIFICATION 15 | |
| | | BOUND-TO-VALUE DESCRIPTORS OF SUBORDINATE PARTS OR ATTACHMENTS OF PARENT OBJECT 16 | |
| | | BOUND-TO-PRESENCE DESCRIPTORS OF SUBORDINATE PARTS OR ATTACHMENTS OF PARENT OBJECT 17 | |
| | | BOUND-TO DESCRIPTORS OF OTHER SDOs 18 | |
| SIGNATURE PROOF BLOCK | SIGNATURE TARGET HASH OR CERTIFICATE OF AUTHENTICITY 19 | | |
| | OPTIONAL ELEMENTS: | DATE/TIME VALUE FOR TIMEOUT 20 | |
| | | CERTIFICATE OF AUTHENTICATION OF SIGNER 21 | |
| | | CERTIFICATE OF DELEGATION FROM ON-BEHALF-OF PRINCIPAL 22 | |

ELECTRONIC DOCUMENT

SIGNATURE DATA OBJECT

SIGNATURE DATA OBJECT

| SIGNATURE DATA OBJECT | | |
|---|---|---|
| SIGNATURE HEADER | SIGNATURE UNIQUE IDENTIFIER 1 | |
| | DATA/TIME STAMP 2 | |
| | APPLICATION PROCESS IDENTIFIER 3 | MAJOR VERSION 4 |
| | | MINOR VERSION 4 |
| | PRINCIPAL IDENTIFIER OF SIGNER 5 | |
| | MESSAGE CODE W/ SEMANTIC 6 | |
| | OPTIONAL ELEMENTS: | USER PROFILE DATA 7 |
| | | ROLE IDENTIFIER 8 |
| | | ON-BEHALF-OF PRINCIPAL IDENTIFIER 9 |
| | | SUBMITTING-SESSION IDENTIFIER 10 |
| | | SECURITY DOMAIN IDENTIFIER 11 |
| | | SID OF SUPERSEDED SDO ON SAME PARENT OBJECT 12 |
| | | COMMENT STRING(S) 13 OR OTHER APPLICATION-SPECIFIC DATA ELEMENTS |
| SIGNATURE DATA | UID OR DESCRIPTOR OF PARENT OBJECT 14 | |
| | OPTIONAL ELEMENTS: | DESCRIPTORS OF IDENTIFIED PARTS OF PARENT OBJECT AND VALUE EXPRESSION SPECIFICATION 15 |
| | | BOUND-TO-VALUE DESCRIPTORS OF SUBORDINATE PARTS OR ATTACHMENTS OF PARENT OBJECT 16 |
| | | BOUND-TO-PRESENCE DESCRIPTORS OF SUBORDINATE PARTS OR ATTACHMENTS OF PARENT OBJECT 17 |
| | | BOUND-TO DESCRIPTORS OF OTHER SDOs 18 |
| SIGNATURE PROOF BLOCK | SIGNATURE TARGET HASH OR CERTIFICATE OF AUTHENTICITY 19 | |
| | OPTIONAL ELEMENTS: | DATE/TIME VALUE FOR TIMEOUT 20 |
| | | CERTIFICATE OF AUTHENTICATION OF SIGNER 21 |
| | | CERTIFICATE OF DELEGATION FROM ON-BEHALF-OF PRINCIPAL 22 |

SIGNATURE DATA OBJECT

BACKGROUND OF THE INVENTION

The invention relates to a machine-readable data structure encoding security information for use in authenticating electronic documents (sometimes referred to herein as electronic business documents or "EBD") and to methods for using the data structure.

Systems for handling electronic documents within a computer system must address the problems of creation, routing, tracking, and approval of such documents in contexts such as a wide-area network (WAN) environment across multiple desktops (i.e., multiple workstations on a network). It is known for business applications utilizing online electronic business documents to permit the "signature" of a document through the affixation of a special code indicating, e.g., approval or disapproval of specific matters set out in the document. Additional background information concerning some techniques that can be useful in generating and validating such signatures, such as public/private key encryption and the use of certificates of authority, are discussed in commonly assigned and co-pending application Ser. No. 589,925, "Delegation to Session Key," filed Sep. 28, 1990, now U.S. Pat. No. 5,224,163 which is incorporated herein by reference for background purposes.

SUMMARY OF THE INVENTION

In accordance with the invention, a "signature data object" (SDO) is a machine-readable structured data record that is created by data acquisition techniques described below and associated with a document. Each SDO data record comprises three required encoded parts, each of which in turn includes its own encoded elements:

1. The Signature Header;
2. The Signature Data; and
3. The Signature Proof Block.

The SDO can encode the following:
  That a specific individual ("signer")
  acting within a specific role
  on a given time and date
  generated a signal encoding a unique mark
  that was applied to the specific parent object
  indicating approval/denial/or other specified judgment
  qualified with/without a free text comment,
  and optionally binding the future validation of the mark
  to specific contents and/or attachments of the parent object
  permitting the same or other users of the parent object
  to perform subsequent tests
  that the mark is authentic and remains valid by its own criteria
  where ever in the network the parent object has been routed.

A signature data object can be appended to, and thus serve as a part of, an arbitrary data structure or other object such as a document stored in binary form, e.g., in disk storage. Alternatively, the SDO can include a pointer referring to an arbitrary "object" in a data repository of suitable form, e.g., The signature data object is analogous in function to that of a handwritten signature on a paper business document, although it has additional properties which make it more powerful than a traditional signature in a business environment. The SDO may also contain additional application-specific elements which could also be SIC encoded. These application extensions to the basic function of the signature provide further flexibility and evolvability of the SDO design.

The signature data object is an application-level construct that can be implemented on top of the various security mechanisms of different operating systems and networks and incorporated into usage by different application systems. An advantageous aspect of a signature data object is that a single parent object can have multiple SDOs applied to it with differing levels of semantic tags. For example, multiple SDOs might be applied by multiple versions of an evolving software application.

In use, the signature data object provides a framework for forward and backward compatibility of business function. The basic design of the SDO is independent of the underlying (and frequently changing) end user authentication technologies that may be in use within a given computer system. In particular, an advantageous aspect of the signature data object is that it is not bound to any specific level of security implementation or technology, but rather allows for a range of deployments based on differing technologies which provide different levels of security and authentication services.

BRIEF DESCRIPTION OF THE DRAWINGS

FIG. 2 is a similar illustration of signature data objects that refer to a parent object.

FIG. 3 is a block diagram of a specification of required and optional parts of a signature data object in an exemplar embodiment of the invention.

Figure 1:
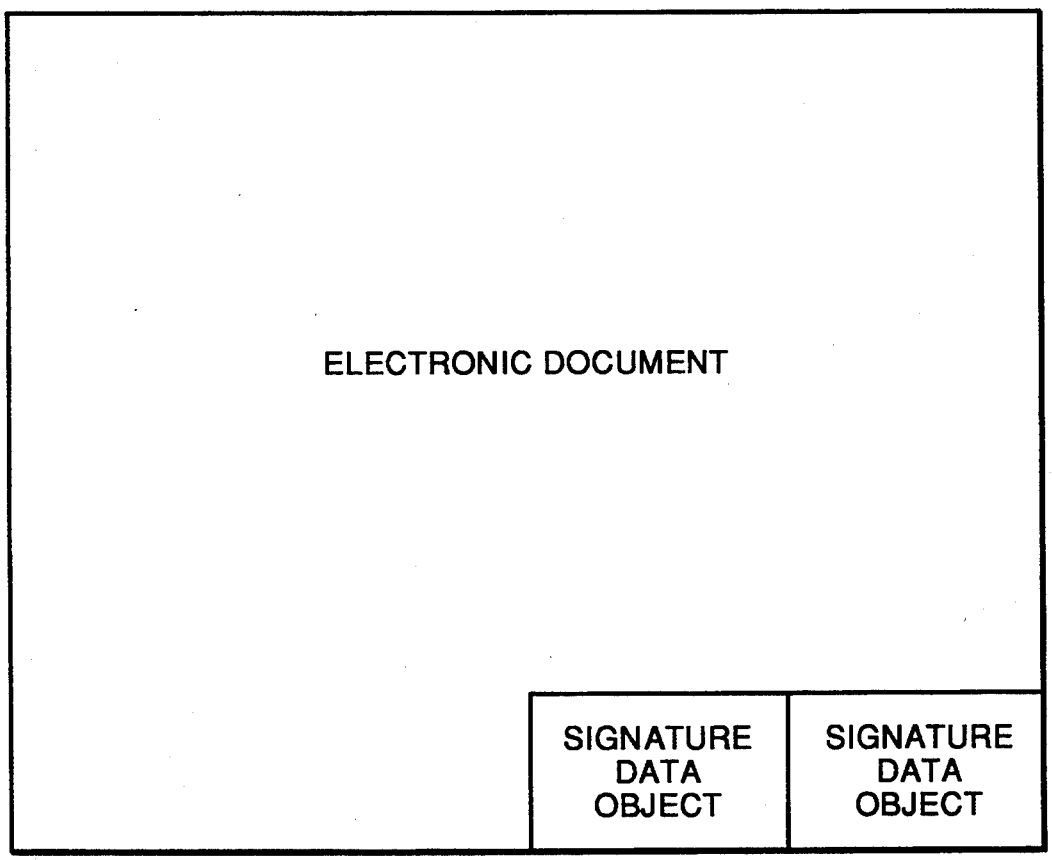
FIG. 1 illustrates one way in which one or more signature data objects in accordance with the invention may be incorporated as part of an electronic document or other parent object.

Reference numerals in FIG. 3 correspond to numbered parts of the signature data object as described below.

DETAILED DESCRIPTION OF SPECIFIC EMBODIMENTS

Data Structures

As shown in FIGS. 1 through 3, a signature data object SDO is a structured record of data that is attached to, or references, some object such as a business document in the storage of a computer system. The object to which an SDO is applied is referred to as its "parent object."

The SDO is a formatted data record; character-string fields in the data may be encoded in a TAG-LENGTH-VALUE (TLV) format or other suitable abstract syntax notation. As is well known to those of ordinary skill, a data record encoded in Tag-Length-Value format can comprise an arbitrary number of fields of arbitrary length, each field comprising a tag to identify the field (e.g., "Last Name"); a length indicator (e.g., "20" to indicate a field length of 20 characters); and the value of the field (e.g., "Smith"). Depending on the implementation, the data record may also be encoded in other convenient formats such as a frame- or object-oriented structure.

Data Acquisition

In the discussion below, certain data are described as being obtained from the signer. It will be immediately recognized by those of ordinary skill having the benefit of this disclosure that a wide variety of data entry devices and approaches may be used, e.g., keyboard entry of alphanumeric characters; pen-based entry of characters or other symbols; selection from menus presented on a display screen; voice input; and the like. Data may be obtained on a real-time basis as needed, and/or obtained at a convenient time and stored for later retrieval as needed.

Other data are described as being obtained from the computer system, e.g., from the operating system. Those of ordinary skill having the benefit of this disclosure will recognize that nearly all modern operating systems have access to a considerable quantity of data about the computer system (e.g., hardware and software components in use) and about end users (e.g., data obtained at login about a user's identity, which then is commonly used to retrieve previously-stored data about user access privileges, preferences, and the like).

Signature Header

The Signature Header comprises SIC-encoded meta data describing the specific signature instance and its meaning in the context of the particular implementation, e.g., the business meaning of the signature instance. As shown in FIG. 3, in an illustrative implementation the required elements of the Signature Header are defined to be the following (although other required elements may be defined for other implementations):

1. a Signature Unique Identifier (SID) for the SDO that is unique over time and space within the universe of possible SDOs defined for the implementation in question, which may be generated in any convenient manner such as through a hash function of, e.g., the date, time, session identification, etc. In the illustrative implementation, the SID is a simple unsigned integer value that is generated to be unique within the parent document of which it is a part. The parent document has its own more globally-unique identifier. The unique identifier of the parent document in the illustrative implementation comprises three fields: An unsigned short field that holds the type code of the object (e.g., a type value of "template" or "object"); an unsigned-long value holding a pseudo-random number seeded with the time of application initialization; and an unsigned-long value holding the time stamp of creation of the document;
2. a date and time stamp of the creation of the SDO, which may be obtained in conventional fashion from the computer system clock or in any other convenient manner;
3. an identifier of the application software which created the SDO, which normally can be obtained from the operating system or alternatively may be obtained from the signer;
4. the major:minor version numbers of that application software, obtained in like manner;
5. a principal identifier of the signer, e.g., "John Quimby," which may be obtained, e.g., from the operating system or from the signer; and
6. a message code representative of a semantic value for the signature, e.g., "approval," "disapproval," or "abstention," or the like, which typically is obtained from the signer.

In the illustrative implementation, the Signature Header may also include the following optional elements:

7. user profile data of the individual applying the signature, e.g., an employee badge number and telephone number, which may be obtained from the operating system or from the signer;
8. a text string qualifying any role behavior of the signer, e.g., "signing as EBDS architect," which may be obtained, e.g., from the signer or from the operating system;
9. a principal identifier of an associated end user on whose behalf the signature was applied, e.g., the name of a superior who is on vacation, which may be obtained from the signer;
10. the identity of the submitting session if other than that of the signer, which may be obtained from the operating system;
11. an identifier of a security domain from which the SDO was created, which may be obtained from the operating system or from the signer;
12. a Signature Unique Identifier (SID) of another signature data object for the same parent object that is superseded by the SDO, which may be obtained from the operating system or the signer. The interpretation (including its appropriateness), of the supersede semantic will depend on the specific application and the business policy in effect. The SDO model itself does not constrain the signature policies supported; and
13. one or more comment strings or other application-specific data elements specified by the user or submitting session.

Signature Data

The Signature Data is an SIC-encoded group of data elements that describe the object to which the signature's validity is bound, along with any additional application-specific data contained within the SDO itself such as a "signature comment." In an illustrative implementation, the single required element of the Signature Data is one or both of the following:

14.1 a unique identifier of the parent object (for use when the SDO is a subordinate part of the parent object); and/or 14.2 a descriptor of the parent object, e.g., a full-path specification of an electronic-document parent object (for use when the SDO is maintained separately from the parent object).

In addition, optional elements of the Signature Data in the illustrative implementation may include:

15. a descriptor for each of one or more identified parts of the parent object and, for each descriptor, a value expression specification of the data elements. For example, an SDO may include a descriptor of a "total value" field of a purchase order document as well as a value specification that the total value is equal to $4,892.00. As another example, the SDO may have a descriptor for the "total value" field of the purchase order but may have a value specification that the total value is less than $5,000.00. A descriptor may point to a field within the parent document with a specific value, e.g., $4,892.00. Alternatively, a descriptor may point to a field and evaluate the value within a simple expression, e.g., "is the value of the field less than or equal to $5,000.00?". In the latter case the value of the expression is used;

16. One or more descriptors of subordinate parts or attachments of the parent object to whose contents or value the signature data object is bound. This "contents of" semantic allows for binding of an SDO to a specific revision of separate modifiable parts of the parent object;

17. One or more descriptors of subordinate parts or attachments of the parent object to whose presence (as opposed to contents or value) the signature data object is bound. This "presence of" semantic allows for part of the parent object to be revised and still fulfill the binding requirement, e.g., a justification memo attached to an expense voucher can be revised without affecting the validity of a signature data object that is bound to the expense voucher and that has a presence-of descriptor for the justification memo; and 18. One or more descriptors (encoded as SIDs) to other existing SDOs on this parent object to whose presence and validity this SDO is also bound.

Signature Proof Block

The Signature Proof Block contains TLV-encoded elements which describe any security and validation methods used in the construction of the signature (e.g., major and minor version number again) and any data associated with the proof of validity (e.g., a certificate for the signature data object as a whole). In the illustrative implementation, the single required element of the Signature Proof Block is one of the following:

19.1 Signature target hash (the tag of this element indicates which hash technique was used). In the illustrative implementation, during signature validation a string is formed by concatenating all of the bound elements pointed to by descriptors in the signature data section of the SDO. This string is then reduced to a target hash using the hash technique specified. (e.g. Message Digest V4.0) The target hash can then be compared against the stored hash value in the signature proof block. If they are equal, then the signature is considered valid according to the data and proof block contents; or 19.2 A certificate of authentication of the SDO itself. Such a certificate provides a level of assurance that the signature has not been tampered with since it was applied by the application.

Optional elements of the Signature Proof Block in the illustrative implementation may include:

20. a date-and-time stamp denoting a timeout value for the signature, discussed in more detail below. To be valid, this must post date the date of signature creation;

21. a certificate of authentication of the principal signer;

22. an optional certificate of delegation from an associated user on whose behave the signer is constructing the signature.

Creation of Signature Data Object

Creation of a signature data object is straightforward and involves two stages: Data collection and writing of a structured data record to appropriate storage such as disk storage. Data collection may be accomplished in any manner convenient to the operating system and application(s) in use.

Validation of Signature Data Object

A principal use of the signature data object is validation. Once applied to a parent object, an SDO may be tested for validity multiple times during the life of the parent object. The validation does not alter the SDO, and may be performed either at an end user's specific request through an application user interface or by the application itself as a result of some triggering event. An advantage of the SDO design is that individual SDO's can bind to specific contents of the parent object which may change over time, invalidating the SDO.

SDO Validation Based on Form: A first level of validation is whether the SDO is well formed, i.e., whether it includes all required parts (such as the three required parts of the illustrative implementation). If all of the required parts are not present, the signature is determined to be invalid due to bad form.

SDO Validation Based on Timeout: A second level of validation is derived by examining the optional timeout value of the signature in the signature proof block. If the timeout is specified and its value predates the current time, the signature is determined to be invalid due to timeout.

SDO Validation Based on Data and Proof Block Contents: A subsequent validation process may be driven by the contents of the Signature Data and Signature Proof Block elements. A signature is considered valid if it meets all the criteria established by these elements. For example, all elements within the Signature Proof Block, including any optional elements and application-specific elements, must be valid in order for the SDO as a whole to be valid. This allows varying implementations to provide more sophisticated levels of validation on an incremental basis according to changing needs.

The model does not constrain the meaning that an application may place on upon discovery of one or more invalidated SDO's on a parent object. For some applications this may be a perfectly normal, everyday occurrence, whereas for some other applications the discovery may indicate that the parent object or the SDO itself has been maliciously violated. Further, an application might not make the determination, but the policy of usage of an application might specify a judgment on the presence of invalid signatures. In any case, the SDO provides a convenient means for making a determination of validity.

Application-Specific Extensions to the Signature Data Object

In some implementations a signature in an electronic document will contain at a minimum the three basic elements described above, namely the Signature Header, Signature Data, and Signature Proof Block. Additional application-specific elements (or parts within these elements) may be added as long as the additional elements are well-behaved, i.e., as long as they do not invalidate the meaning of existing elements or invalidate signatures already on parent objects. An additional element that satisfies the following constraints should be well-behaved:

1. The additional element does not alter the functional behavior of a previously defined element;
2. The additional element does not invalidate the usage of a previously defined element; and 3. The additional element does not presume consistency of element types across multiple signatures on the same parent object.

In the interest of clarity, not all features of an actual implementation are described. It will of course be appreciated that in the development of any such actual implementation (as in any software development project), numerous programming decisions must be made to achieve the developers' specific goals and subgoals (e.g., compliance with system- and business-related constraints), which will vary from one implementation to another. Moreover, attention will necessarily be paid to, e.g., proper serialization to handle concurrent events, boundary detection, error trapping and -handling, and the like. It will be appreciated that such a development effort would be complex and time-consuming, but would nevertheless be a routine undertaking for those of ordinary skill having the benefit of this disclosure.

What is claimed is:

1. A machine-readable data structure being a signature data object created by a machine-executed process encoding data representing a signal generated by a signer, said signature data object comprising:
   (a) a signature header structure describing said signal and its meaning comprising (1) a signature unique identifier code, (2) a code representing a date and time, (3) an application process identification code identifying a process which created said signature data object, (4) a signer identification code, and (5) a message code imparting a semantic value to the signal generated by the signer;
   (b) a parent object identification code identifying a parent object associated with said signature data object; and
   (c) a signature proof structure describing security and validation methods used in constructing said signature data object and data associated with proving the authenticity and validity of said signal.

2. The signature data object of claim 1, wherein said signer identification code encodes user profile data specific to the signer.

3. The signature data object of claim 1, wherein said signer identification code encodes a text string representing a role played by said signer.

4. The signature data object of claim 1, wherein said application process identification code includes an encoded version number of said process which created said signature data object.

5. The signature data object of claim 1, wherein the data encoded in said signature header structure further comprises at least one of the following:
   (a) a principal identifier of an associated end user on whose behalf the signature is generated;
   (b) an identifier of a security domain from which said signature data object was created; and
   (c) a signature unique identifier of another signature data object having the same parent object that is superseded by said signature data object.

6. The signature data object of claim 1, wherein the data encoded in said parent object identification code further comprises a descriptor for each part of the parent object and a value expression specification associated with each descriptor.

7. The signature data object of claim 6, wherein said parent object is an expense authorization form, wherein said descriptor represents a total monetary value field of a purchase order, and said value expression specification specifies that the total monetary value field is less than a specified amount.

8. The signature data object of claim 1, wherein the data encoded in said parent object identification code further comprises at least one descriptor representing (1) a subordinate part of the parent object or (2) an attachment of the parent object to whose value said signature data object is bound.

9. The signature data object of claim 8, wherein said signature data object represents a signature authorizing expenditures, said parent object is an expense authorization form, and one of said descriptors represents a total monetary value field of a purchase order.

10. The signature data object of claim 1, wherein the data encoded in said parent object identification code further comprises at least one descriptor representing (1) a subordinate part of the parent object or (2) an attachment of the parent object to whose presence said signature data object is bound.

11. The signature data object of claim 10, wherein said signature data object represents a signature of approval, said parent object is an expense voucher, and one of said descriptors represents an attachment which is an expense justification memo.

12. The signature data object of claim 1, wherein the data encoded in said parent object identification code further comprises at least one descriptor of a second signature data object associated with said parent object, wherein the validity of said signature data object is bound to the presence and validity of said second signature data object.

13. A method of transmitting to a receiver an electronic document with a signature of a signer comprising the steps of:
   (a) creating a signature data object in accordance with claim 1;
   (b) associating said signature data object with the electronic document; and
   (c) transmitting the electronic document and said signature object to the receiver.

14. The signature data object of claim 1, wherein said semantic value imparted to the message code comprises one of an approval, a disapproval, or an abstention.

15. A machine-readable data structure being a signature data object created by a machine-executed process encoding data representing a signal generated by a signer, said signature data object comprising:
   (a) a signature unique identifier code;
   (b) a code representing a date and time;
   (c) an application process identification code identifying the process which created said signature data object;
   (d) a signer identification code;
   (e) a message code imparting a semantic value to said signal;
   (f) a parent object identification code identifying a parent object associated with said signature data object;
   (g) at least one descriptor representing (1) a subordinate part of said parent object to whose value or presence said signature data object is bound; and
   (h) a signature proof structure describing security and validation methods used in constructing said first signature data object, and data associated with proving the validity of said signal.

16. The signature data object of claim 15, wherein said signer identification code includes a text string encoding a role played by said signer.

17. A machine-readable program storage device encoding a program comprising machine-executable instructions which, when executed on a computer system, result in creating said signature data object as specified in claim 15.

* * * * *